June 26, 1923.  1,460,122
A. AMES, JR
PHOTOGRAPH AND METHOD OF MAKING THE SAME
Filed Jan. 12, 1920
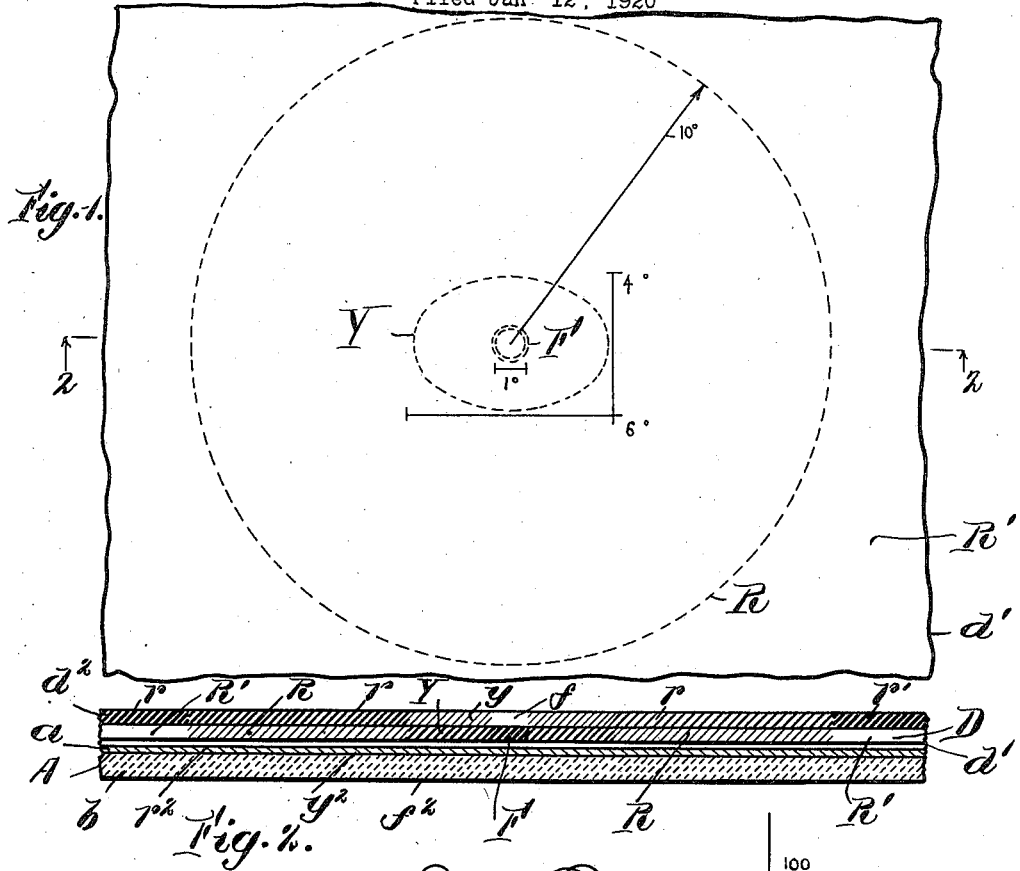
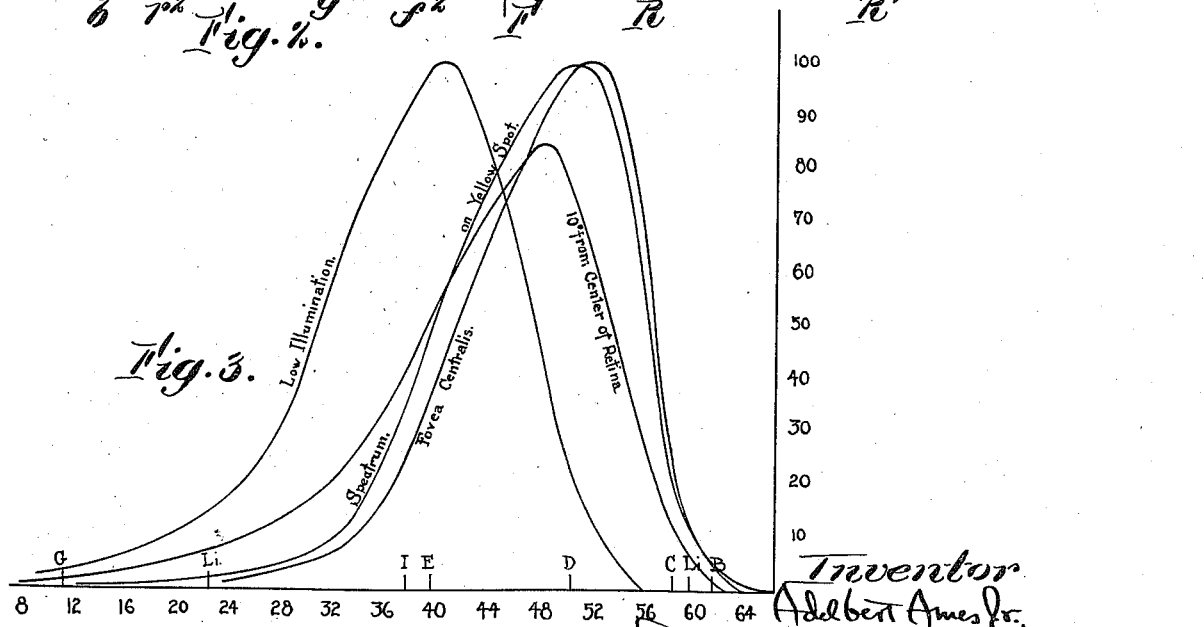
Inventor
Adelbert Ames Jr.
by Roberts, Roberts & Cushman
his Atty's.

Patented June 26, 1923.

1,460,122

UNITED STATES PATENT OFFICE.

ADELBERT AMES, JR., OF TEWKSBURY, MASSACHUSETTS.

PHOTOGRAPH AND METHOD OF MAKING THE SAME.

Application filed January 12, 1920. Serial No. 351,012.

*To all whom it may concern:*

Be it known that I, ADELBERT AMES, Jr., a citizen of the United States, and resident of Tewksbury, in the county of Middlesex and State of Massachusetts, have invented new and useful Improvements in Photographs and Methods of Making the Same, of which the following is a specification.

This invention relates to photography, and is particularly concerned with both the character of the photographic picture and the means employed for obtaining such a picture.

Photography as heretofore carried out in a pictorial sense has aimed to present to perception a record of the natural things portrayed recognizable, with more or less aid by the imagination, as a reproduction of the objects depicted.

At best, photographs are limited to a partial presentation only of the factors or qualities giving distinguishing appearance to natural objects as viewed by the human eye. The natural objects are tri-dimensional, but the photograph must be viewed as a plane projection, either as thrown upon a screen, as a transparency seen against an illuminated background, or as an arrangement of light and dark places on a paper or other surface. The complete illusion of looking at the object pictured is not reached by any photograph because of the artificiality of the picture due to these reasons. Absence of color is of course also a factor in failure of illusion, but not the most important factor.

Apart from these inherent qualities of any photograph, photography as heretofore practiced has also failed of illusion in more subtle qualities. The makers of lenses have sought mathematically exact definition, absence of distortion and correction of diffusion at all parts of the field represented by the photographic picture, so that the average photograph contains a too faithful record of the detailed outline and light and shadow in every portion of the angular field of view represented by the print or screen image constituting the picture.

Persons skilled in the graphic arts and competent critics of artistic effort have long realized the illusive and esthetic limitations of pictures of this nature, of which the faults in general may be summed up as lack of concentration of attention at the center of interest, lack of illusion of the appearance of objects away from the center of interest, lack of aerial or monocular perspective, and lack of color except in polychromatic photographs, in which falsity of color is also characteristic. These qualities in photographs are generally accompanied by lack of reasonably accurate monachromatic translation of the appearance of polychromatic values, and lack of proper range of value from light to complete shadow.

In my application of even date herewith Serial No. 351,011, filed January 12, 1920, I have explained a new type of photograph, and a new lens system for practicing a method of forming images having the characteristic diffusions, aberrations and distortions of the subjective impression of the object-field as perceived by the eye.

I have further devised an art of and apparatus for making, and a photograph characterized by a distribution of sensitiveness to color, adapted for use with the method and apparatus of my said application or with ordinary photographic methods and appliances, and when so used further contributing to the appearance of the photograph characteristics adapted to be recognized as characteristics of the subjective impression of the appearance of natural objects made upon the normal eye.

The present invention has to do with the simulation of the sensitiveness of the retinal surface of the eye, especially in respect to stimulation by color. Discovery by research shows a marked selective distribution of sensitivity to color of the human eye, and I shall herein describe contributions to the art for the purpose of causing photographic pictures to conform, whether monochromatic or polychromatic, to the appearance expected by the normal eye in respect to the value of representations of differently colored objects, especially in respect to the position of the object in the line of sight or center of interest, or elsewhere at an angle to this line of sight, in the object field.

One aspect of my invention is particularly applicable to the making of monochromatic component pictures for selective color by superposition of differently colored monochromes, thus making polychromatic photographs in the colors of nature. One subordinate object of the invention is to provide means for securing a variable sensitiveness of the plate with respect to a colored impression while maintaining uniformity or other predetermined distribution of degree of sensitiveness in a quantitative sense upon the plate in relation to its axial center and angular regions.

In the accompanying drawings,—

Figure 1 is a diagram in plan illustrating central areas of the completed photograph and of selective screens employed between the plate and the photographic lens;

Figure 2 is a section on the line 2—2 of Fig. 1, illustrating a typical arrangement according to the invention; and Figure 3 is a diagram illustrating quantitatively the distribution of intensities of perception of light of different wave lengths or colors in respect to the retina of the normal eye, and also showing the distribution of intensities of perception at low illuminations.

Referring to the drawings, photographs corresponding to the invention are positive or negative projections, transparencies or prints produced by any preferred process from a negative A, Fig. 2, which may comprise any preferred sensitive emulsion coating $a$ on any kind of backing $b$ such as the flat glass plate indicated, when suitably exposed and developed.

For the particular purposes of this invention, the coating $a$ should approach the color sensitivity of the eye, so far as average relative degree of chemical sensitiveness to light of different wave-lengths is concerned. A commercial pan chromatic plate having sensitiveness in the yellow light near the sodium D lines, an infra-red limit at about the A lines, and low sensitiveness to wave lengths shorter than the G lines, is satisfactory for the purpose intended. The well-known Wratten pan-chromatic plate, for instance, is a suitable plate.

If such a plate is exposed in the image plane of a photographic lens system (preferably such a lens system as described in my said application for Letters Patent of the United States), its reaction to the luminous intensities of the image will be uniform throughout the exposed surface of the plate. As explained in my said application illusive photography requires the impression upon the plate of certain diffusions, aberrations and distortions; in these respects the plate A alone satisfactorily records the image.

But for color photography, or for monochromatic photographic expression of panchromatic values improving the monochromatic picture, I prefer also to distribute the panchromatic sensitivity of the plate or other image receiving surface according to the similar distribution of sensitivity in the retina of the normal human eye. For clear explanation it is necessary to understand certain peculiarities of the eye with respect to perception of color.

Referring now to Figs. 1 and 3, the clearest seeing part of the retina, the fovea centralis, is concentrated on a surface about one degree of arc wide, situated nearly centrally of the so called "yellow spot", having an oval area about 6 degrees wide in a horizontal direction, and about 4 degrees wide in a vertical direction, and these areas of the retina are about centrally situated in a region of sensitiveness substantially 40 degrees, more or less wide (all as measured from the nodal point of the ocular lens), of less sensitivity than the yellow spot. The outside part of the last mentioned region is sensitive in lessened degrees to something beyond 40 degrees of the visual angle. These different regions of the eye vary substantially in respect to their power of excitation by light of different colors. The result of a careful series of measurements in these particulars is plotted in Fig. 3.

In this figure the various traces show by their ordinates percentages of intensity of visual perception of the bright continuous spectrum from the cathode crater of a carbon arc light at respective regions of the retina, the wave-lengths being indicated according to an arbitrary scale by the abscissæ. The following table of mean readings of these quantities by observation of a number of individual and normal eyes gives the data which the figure graphically shows.

| 1 | 2 | 3 | 4 | 5 |
|---|---|---|---|---|
| Scale number. | Wave length. $\gamma=$ | Outside yellow spot. | Yellow spot. | Fovea centralis. |
| 64 | 7217 | | | |
| 63 | 7082 | | | 1 |
| 62 | 6957 | 1 | 2 | 2 |
| 61 | 6829 | 2 | 4 | 4 |
| 60 | 6728 | 3.5 | 7 | 8 |
| 59 | 6621 | 7.5 | 12.5 | 15.5 |
| 58 | 6520 | 12.5 | 21 | 24 |
| 57 | 6423 | 19 | 33 | 37.5 |
| 56 | 6330 | 27.5 | 50 | 60 |
| 55 | 6242 | 35 | 65 | 77 |
| 54 | 6152 | 43 | 80 | 90 |
| 53 | 6074 | 52.5 | 90 | 97 |
| 52 | 5996 | 61 | 96 | 100 |
| 51 | 5919 | 71 | 99 | 100 |
| 50 | 5850 | 79 | 100 | 98 |
| 49 | 5873 | 84 | 99 | 95 |
| 48 | 5720 | 85 | 97 | 90 |
| 47 | 5658 | 83.5 | 92.5 | 85 |
| 46 | 5596 | 81 | 87 | 79 |
| 45 | 5538 | 77 | 81 | 72.5 |
| 44 | 5481 | 72.5 | 75 | 66 |
| 43 | 5427 | 68 | 69 | 59 |
| 42 | 5373 | 62.5 | 62.5 | 51 |
| 41 | 5321 | 57 | 57 | 45 |
| 40 | 5270 | 52 | 50 | 40 |
| 39 | 5221 | 46 | 42.5 | 32 |
| 38 | 5172 | 41.5 | 36 | 27.5 |
| 37 | 5128 | 37.5 | 29.5 | 22 |
| 36 | 5085 | 33.5 | 24 | 18 |
| 35 | 5043 | 30 | 18.2 | 14 |
| 34 | 5002 | 26.5 | 14.2 | 10 |
| 33 | 4963 | 24 | 10.5 | 8.4 |
| 32 | 4924 | 21 | 8.5 | 6.5 |
| 31 | 4885 | 18.5 | 7 | 5.5 |
| 30 | 4848 | 16.5 | 5.5 | 4 |
| 29 | 4812 | 14.5 | 4.7 | 3.5 |
| 28 | 4776 | 13 | 4 | 3 |
| 27 | 4742 | 11.5 | 3.5 | 2 |
| 26 | 4707 | 10.5 | 2.8 | 2.4 |
| 25 | 4675 | 9.4 | 2.3 | 2.1 |
| 24 | 4639 | 8.2 | 1.82 | 1.9 |
| 23 | 4608 | 7.3 | 1.6 | 1.5 |
| 22 | 4578 | 6.3 | 1.4 | |
| 21 | 4548 | 5.7 | 1.2 | |
| 20 | 4517 | 5 | 1.08 | 1 |
| 19 | 4488 | 4.5 | .94 | |
| 18 | 4459 | 4 | .86 | |
| 17 | 4437 | 3.6 | .78 | |
| 16 | 4404 | 3.1 | .70 | |
| 15 | 4377 | 2.7 | .62 | .62 |
| 14 | 4349 | 2.3 | .56 | |
| 13 | 4323 | 2.1 | .50 | |
| 12 | 4296 | 1.9 | .45 | |
| 11 | 4271 | 1.65 | .40 | |
| 10 | 4245 | 1.4 | .34 | |
| 9 | 4221 | 1.2 | .30 | |
| 8 | 4197 | 1 | .26 | |
| 7 | 4174 | .88 | .22 | |
| 6 | 4151 | .75 | .18 | |
| 5 | 4131 | .63 | .16 | |
| 4 | 4106 | .50 | .14 | |

It will be observed that the maximum intensity at the fovea centralis is in the yellow light between wave-lengths $\gamma=5919\mu$ and $\gamma=5996\mu$; that the equivalent maximum for the yellow spot is at $\gamma=5850\mu$ and that the visual intensity of the same light on the surrounding region 10° from the fovea is only about 85% of that for the fovea and yellow spot and maximum at about $\gamma=5720\mu$; but that this region exceeds the yellow spot and fovea in sensitiveness to the greens and blues extending from $\gamma=5270\mu$ to the ultra-violet visual limit.

If these values are determined in low illuminations, the normal eye undergoes not only pupillary expansion, but also changes its selective color sensitivity. The same spectrum when reduced in intensity to the photometric value at the D lines of 1/132.5 of the illumination by a standard amyl lamp at a distance of one foot affects the retina according to the following table:

| Scale number. | Wave length. | Mean reading reduced to 100 maximum. |
|---|---|---|
| 56 | 6330 | 5.4 |
| 54 | 6152 | 5 |
| 52 | 5996 | 13 |
| 50 | 5850 | 24 |
| 48 | 5720 | 42 |
| 46 | 5596 | 66 |
| 44 | 5481 | 84 |
| 42 | 5373 | 95 |
| 40 | 5270 | 100 |
| 38 | 5172 | 94 |
| 36 | 5085 | 84 |
| 34 | 5002 | 72 |
| 32 | 4924 | 58 |
| 30 | 4848 | 45 |
| 28 | 4776 | 32 |
| 26 | 4707 | 23 |
| 24 | 4639 | 17.5 |
| 22 | 4578 | 14 |
| 20 | 4517 | 11 |
| 14 | 4349 | 5 |
| 10 | 4245 | 2.5 |

The maximum perceptive intensity under these circumstances shifts into the green at about $\gamma=5270\mu$, the perception of longer wave-lengths being markedly inhibited and of shorter wave lengths markedly increased.

It will now be apparent that an illusive photograph giving either a correct monochromatic translation of panchromatic values, or comprising a polychromatic composite of monochrome elements, should faithfully record the different values of the image perceived at the center of interest (by the fovea) at the region nearby (by the yellow spot) and at the outlying parts of the visual angle (by the remainder of the retina).

Whatever the photographic means employed, a plate uniformly sensitive to color and uniformly exposed to the image in a camera can not comply with these conditions. This invention therefore comprises a genus of new devices enabling the plate to record variably in a chromatic sense the image at the center of interest and the image at differing angles of departure from the line of sight connoted by this center.

A preferred instance will now be described in connection with Figs. 1 and 2.

Let it be assumed that the photograph is to be made at an image plane corresponding to a known visual angle. This will be true for any constant arrangement of lenses, such as the lens-system described and claimed in my said application. Different areas of a sensitive plate exposed in such an image plane will therefore correspond to the respective retinal surfaces of the eye.

Provision is now made for maximum chromatic sensitiveness of the plate at a maximum corresponding to the chromatic maximum of the fovea centralis in a region near the optical axis of the camera lens, for instance at $f^2$, for decreased chromatic sensitiveness at the immediately surrounding region $y^2$, and for further decreased sensitiveness to the maximum luminosity color and relatively increased sensitiveness to shorter wave lengths in a surrounding zone $r^2$, and finally the remainder of the plate is rendered insensitive to all except the shorter wave-lengths for the remainder of its surface.

These qualities may be imparted to the plate by suitable local treatment of the emulsion, but a preferred expedient is to influence the color of the image incident upon the plate with the aid of a suitable absorption screen D. This screen should be so devised as to impose no quantitative absorption, its function being to influence the color only of the light transmitted thereby without alteration of the uniformity of distribution in a quantitative sense of the light incident upon it. Figs. 1 and 2 illustrate a preferred construction for this purpose. The screen is in two parts, a colored plate $d'$ and a corrector plate $D^2$, preferably of a colorless but variable transparency.

As suggested above, the commercial panchromatic or orthochromatic plate is capable of sufficient accuracy of maximum color sensitiveness at the right part of the spectrum, but in practice this is usually attained with the aid of a color filter or absorption screen, which is generally arranged to exclude some of the light of shorter wave length, in aid of the selective chemical treatment of the film surface $a$, the absorption screen generally having the powers of transmission equivalent to a thin film of sodium bichromate or some other yellow dye or stain. The new screen $d'$ is of this nature at the region F, preferably a circular region subtending about one degree of arc with respect to the nodal point of the lens. The part of the plate $f^2$ under this spot will then have a sensitiveness corresponding to the sensitiveness of the fovea.

The screen $d'$ is also provided with a region Y preferably an oval about six degrees long and about four degrees wide with respect to the nodal point. This region is colored with an attenuated dye or pigment permitting more of the shorter wave length light to pass. The surrounding, preferably circular region R of the absorption screen is colored with a still more attenuated dye. The remainder R' of the absorption screen may be transparent and uncolored.

It will be observed that the selective absorption of the absorption screen $d'$ is distributed as it is in the normal human eye, but if such a screen $d'$ were interposed alone between the plate and the lens, a substantial part of the quantity of light incident on the plate would be cut off by the regions F, Y, R, of the screen, whereas the illumination of the plate should be uniform so far as the function of the absorption screen is concerned.

This is provided for by superposing upon the absorption screen $d'$ the corrector screen $d^2$, which may or may not be colored to influence the color of the light transmitted. For use with such plates as those mentioned, preferably the corrector screen is colored with a neutral pigment. Its central region $f$ corresponding to the spot F may be quite transparent; the surrounding region $y$ corresponding to the spot Y is lightly tinted; the larger circular region $r$ corresponding to the region R is more heavily tinted, and the remainder of the surface $r'$ is still more deeply tinted.

The mutual arrangement of the screens $d'$ and $d^2$ is such as to cause quantitative uniformity of transmission of light through them when they are superposed. Such screens may be made of any suitable material and by any suitable process. They may be made of glass suitably pigmented; or they may be made of clear glass having a suitable pigmented coating; or they may comprise clear glass enclosing films of gelatine or other transparent colloidal substance locally dyed or pigmented as described.

Whatever the detail of the material employed the distribution of the pigment or coloring of the selective screen should substantially correspond in effect upon the transmitted light to the variable sensibility of the corresponding regions of the retina, as explained above.

When it is desired that the photograph shall aid the impression of low illumination, the device and method of this application may be employed without change except the substitution for the screen $d'$ of a screen of another color more absorbent of the red end of the spectrum and less absorbent of the blue end. The effect may be still further enhanced by making the screens for low illumination with less absorptive difference between the central spot and the yellow spot region Y and the surrounding area R, and the difference between the region R and the region R' may be still less in degree. The neutral corrector is correspondingly altered. In general, the photometric density of the various regions of screens may vary among themselves in proportion to the areas of the appropriate curves shown in Fig. 2.

It will be understood that the margins or boundaries between the differently tinted areas of the components of the absorption screen should not be sharp or hard lines; these regions merge one into the other with a gradual diffusion, the complemental parts of the plate being so merged or diffused in an opposite sense as to maintain uniformity or photometric value of the superposed components throughout.

I claim:—

1. A photograph having a region depicted with maximum effect upon the photo-sensitive surface by one color of light and having other regions depicted with maximum effect upon the photo-sensitive surfaces of another color of light, the picture being formed by polychromatic light.

2. A photograph having a central region depicted with maximum effect upon the photo-sensitive surface of light of a certain wave length and having other regions depicted with maximum effect upon the photo-sensitive surfaces of light of lesser wave-length, every part of the picture being formed by polychromatic light.

3. A photograph depicting an image subjected to selective absorptions of color of its central region different from the selective absorption of color for the outlying regions.

4. A photograph having concentric regions depicting an image, said regions being subjected respectively to different selective absorptions of color.

5. A photograph depicting an image subject to the optical diffusions, aberrations and distortions characteristic of normal human vision, and also having depicted therein the effect of different color-absorption of the image at different regions in respect to the axial center of interest.

6. A photograph having regions subjected respectively to different color absorptions of the image-forming light at said regions, said image-forming light being uniformly affected by the absorption of light as regards the quantitative or photometric value of the light transmitted to the photo-sensitive surface.

7. A photograph characterized by concentric regions subjected to different color absorption of the image-forming light, said regions having substantially the angular magnitude in respect to the nodal point of the image-forming lens system characteristic of regions of different color sensitivity in the retina of the normal human eye.

8. A photograph characterized by concentric regions subjected to different color absorption of the image-forming light, said regions having substantially the angular magnitude in respect to the nodal point of the image-forming lens system characteristic of the fovea centralis, the yellow spot, and the central surrounding region of the normal human eye.

9. The art of photography comprising exposing a photo-sensitive surface to a polychromatic image subjected to selective chromatic absorption of light to degrees varying progressively from one region to another.

10. The art of photography comprising exposing a photo-sensitive surface to a polychromatic image subjected to selective chromatic absorption of light to degrees varying progressively from one region to another, and comprising as a step, subjecting the light of the image to compensating colorless obstruction.

11. The art of photography comprising exposing a plate of uniform color sensitiveness to a polychromatic image subjected to selective chromatic absorption of light to degrees varying progressively from one region to another.

12. The art of photography comprising interposing between a photo-sensitive surface and an image-forming lens an absorption-screen having different powers of absorption in different regions, and a corrector screen having inversely arranged colorless absorption areas.

13. The art of photography comprising exposing a photo-sensitive surface to a polychromatic image subjected to uniform absorption of its light, the color of the absorbed light varying from region to region of the image.

Signed by me at Boston, Massachusetts, this thirtieth day of December, 1919.

ADELBERT AMES, Jr.